United States Patent
Roe et al.

(10) Patent No.: US 9,997,875 B2
(45) Date of Patent: Jun. 12, 2018

(54) CONNECTOR AND CABLE WITH TORQUE-LIMITING FEATURES

(71) Applicant: Carlisle Interconnect Technologies, Inc., Saint Augustine, FL (US)

(72) Inventors: Christopher Roe, Lake Forest, CA (US); Hau Tran, Anaheim, CA (US)

( * ) Notice: Subject to any disclaimer, the term of this patent is extended or adjusted under 35 U.S.C. 154(b) by 0 days. days.

(21) Appl. No.: 15/070,906

(22) Filed: Mar. 15, 2016

(65) Prior Publication Data

US 2017/0271825 A1  Sep. 21, 2017

(51) Int. Cl.
| | | |
|---|---|---|
| H01R 25/00 | (2006.01) | |
| H01R 13/62 | (2006.01) | |
| H01R 24/40 | (2011.01) | |
| H01R 13/629 | (2006.01) | |
| F16D 9/06 | (2006.01) | |
| F16B 31/02 | (2006.01) | |
| H01R 13/512 | (2006.01) | |
| H01R 31/06 | (2006.01) | |
| H01R 103/00 | (2006.01) | |
| H01R 9/05 | (2006.01) | |

(52) U.S. Cl.
CPC ........... *H01R 24/40* (2013.01); *F16B 31/021* (2013.01); *F16D 9/06* (2013.01); *H01R 13/512* (2013.01); *H01R 13/629* (2013.01); *H01R 31/06* (2013.01); *H01R 9/05* (2013.01); *H01R 13/62* (2013.01); *H01R 2103/00* (2013.01)

(58) Field of Classification Search
CPC ........ H01R 24/54; H01R 25/00; H01R 31/06; H01R 33/88; H01R 33/94; H01R 13/639; H01R 13/6397

USPC .......................... 439/638, 301, 258, 153, 372
See application file for complete search history.

(56) References Cited

U.S. PATENT DOCUMENTS

| | | | |
|---|---|---|---|
| 4,279,458 A * | 7/1981 | Knapp | H01R 13/622 285/316 |
| 4,522,458 A * | 6/1985 | Werth | H01R 13/635 439/154 |
| 4,575,274 A | 3/1986 | Hayward | |
| 5,427,542 A * | 6/1995 | Gerow | H01R 13/633 29/876 |
| 6,086,282 A | 7/2000 | Dutt et al. | |

(Continued)

OTHER PUBLICATIONS

International Searching Authority, Internation Search Report in International Application No. PCT/US2017/021826, dated May 4, 2017.

*Primary Examiner* — Abdullah Riyami
*Assistant Examiner* — Thang Nguyen
(74) *Attorney, Agent, or Firm* — Wood Herron & Evans LLP

(57) ABSTRACT

A connector includes separate portions that rotatably couple together and form a connector. The portions include elements for defining cavities and or slots therebetween that accept one or more shear elements, such as shear pins for the purposes of coupling the separate portions together in forming a unitary connector. The connector might be used between a cable and another connector or could form part of the connector on a cable. The shear element is configured for engaging the various portions and spanning across the interface for joining the portions together. The shear element is configured for breaking when a sufficient torque force is applied between the connector portions.

24 Claims, 14 Drawing Sheets

(56) References Cited

U.S. PATENT DOCUMENTS

| | | | |
|---|---|---|---|
| 6,450,541 B1* | 9/2002 | Bakke | E21B 17/06 |
| | | | 285/2 |
| 6,827,597 B1* | 12/2004 | Metzbower | H01R 13/502 |
| | | | 439/320 |
| 7,097,490 B2* | 8/2006 | Eaton | H01R 13/633 |
| | | | 439/350 |
| 8,087,436 B2* | 1/2012 | Danielson | F16L 37/138 |
| | | | 141/392 |
| 2005/0037664 A1 | 2/2005 | Weidner | |
| 2012/0171884 A1* | 7/2012 | Dang | H01R 13/6463 |
| | | | 439/310 |
| 2013/0157487 A1* | 6/2013 | Heebe | H01R 13/635 |
| | | | 439/153 |
| 2014/0154906 A1* | 6/2014 | Lee | H01R 13/622 |
| | | | 439/321 |
| 2016/0233633 A1* | 8/2016 | Janitch | H01R 25/00 |

* cited by examiner

CONNECTOR AND CABLE WITH TORQUE-LIMITING FEATURES

FIELD OF THE INVENTION

This Application is directed to connectors, and more specifically, to threaded coaxial RF connectors and other electrical connectors.

BACKGROUND OF THE INVENTION

Connector structures for RF cables and electrical connections, such as for handling high frequency RF signals, are often threaded connectors that are threaded onto and tightened with a corresponding connector. For example, male and female connectors may have opposing internal/external threaded structures that mate together, and are tightened to form a good electrical connector. Various such RF connectors are generally precision connectors that have a somewhat fragile construction.

For example, some miniature connectors, such as SMA connectors, are utilized with coaxial cables and have a small screw-type male coupling mechanism that includes a nut having an internal threaded section that mates with a small female mechanism with external threads. When a threaded connector is threaded onto a mating connector, the coupling nut is then rotated with a wrench or other tool to tighten the connector, and seat the threads together for a robust electrical connection.

One particular problem with any screw-on connectors, and particularly those smaller, miniature and sub-miniature connectors that are used for precise coaxial RF applications, is that there is the potential risk of over-torquing the coupling nut. As may be appreciated, generally the length of wrenches and other tools and the manual forces that are used to tighten such small connectors have the ability to create forces on the connector and coupling structures that may damage a mating connector and the threads on a mating connector. Often, users of such connectors believe that a tighter connection will provide a better electrical connection, and thus, there can be a tendency to provide more torque than is necessary.

Such over-torquing is particularly a problem when the mating connectors are utilized on electrical equipment. For example, an array of mating connectors might be incorporated onto the backplane of electronic equipment that is then coupled to one or more RF cables utilizing such precision connectors. As such, over-torquing and damaging or destroying the connector may also damage or destroy the electronic equipment. At a minimum, the mating connectors on the electronic device would have to be repaired or replaced. In certain connector applications, the mating interface is in a difficult location to access for the purposes of replacement of such mating connectors. Furthermore, the equipment provided with such mating connectors may be expensive to replace. For example, such precision connectors are used on Vector Network Analyzer (VNA) test equipment. Inadvertent damage from an over-torqued connector can damage the interface module of the VNA, which may potentially cost thousands of dollars to replace.

One solution to such over-torquing is the utilization of a torque wrench. However, such wrenches are not always available. Furthermore, such torque wrenches still would not prevent over-torquing if the user does not utilize the wrench properly. Accordingly, there is a need to mitigate the damage associated with excessive torque in threaded connectors, and to protect a mating connector and the electronic equipment coupled thereto.

SUMMARY OF THE INVENTION

The invention may be implemented in various embodiments. In one embodiment, a connector includes a female portion including a receptacle and a male portion including a center conductor. The male portion is configured for coupling together with the female portion at an interface for forming the connector. A shear collar is formed on at least one of the male portion or female portion and configured for rotatably coupling with the other of the at least one male portion and female portion when the portions are brought together. The shear collar has a first cavity formed therein and extending radially through the collar and the other of the at least one of the male portion and female portion includes a corresponding second cavity extending radially therein so that the cavities are configured for being aligned at the interface when the male and female portions are brought together. A shear pin is configured for engaging both the first and second cavities and spanning across the interface for joining the male and female portions together as a connector and includes a shear section aligned with the interface and configured for breaking when a sufficient torque force is applied between the male portion and the female portion.

In another embodiment, a connector includes a coupling nut portion having a nut section and a collar and a lock nut portion having a threaded section and a collar. The threaded section is configured for being threaded with another connector and the coupling nut portion and lock nut portion are configured for rotatably coupling together at an interface to form the connector. Each of the coupling nut portion and lock nut portions having at least one cavity extending axially for being aligned when the coupling nut portion and lock nut portion are rotatably coupled together. A shear pin is configured for engaging both the aligned cavities and spanning across the interface for joining the coupling nut portion and lock nut portion together as a connector and includes a shear section aligned with the interface and configured for breaking when a sufficient torque force is applied between the coupling nut portion and lock nut portion.

In still another embodiment, a connector includes a coupling nut portion having a threaded section and a collar with at least one slot. A coupling nut sleeve with at least one cavity is configured for rotatably coupling with the coupling nut portion together at an interface to form the connector. The cavity and slot are configured for being aligned when the coupling nut portion and coupling nut sleeve are rotatably coupled together. A shear pin is configured for engaging both the aligned cavity and slot and spanning across the interface for joining the coupling nut portion and coupling nut sleeve together as a connector that is rotated as a unitary element. The shear pin spans the interface and is configured for breaking when a sufficient torque force is applied between the coupling nut portion and coupling nut sleeve.

Figure 1:
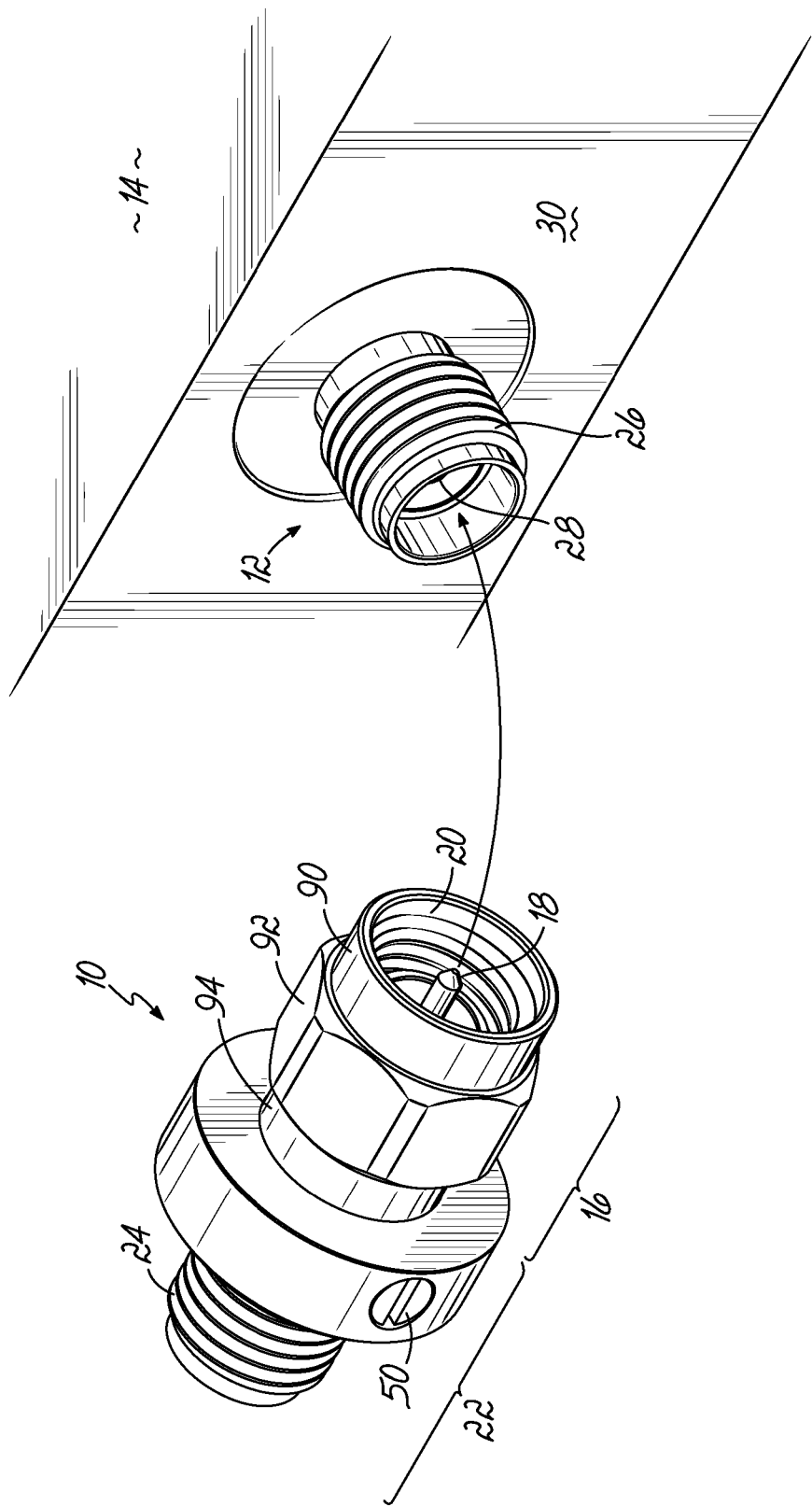
FIG. 1 is a perspective view of a connector in accordance with one embodiment of the invention coupling to a mating connector and equipment.

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of Applicant's general inventive concept.

The present invention addresses the problems noted above, and drawbacks in the prior art by providing a connector and cable having torque-limiting features, wherein one portion of the connector will break away from another portion of the connector upon the application of too much torque in the connection process. As such, further torque forces are prevented, and damage to a mating connector is avoided. In some embodiments of the invention, the cable is coupled with a portion of the connector that breaks away, in an over-torquing condition. As such, the cable may then be pulled away from another portion of the connector. In other embodiments of the invention, the cable remains attached, but can no longer be tightened onto the mating connector.

Generally, precision coaxial connectors, such as SMA connectors, are indicated as male or female connectors based upon a male center pin and a female sleeve counterpart, regardless of the other components that are utilized to secure the different connectors together. As such, a male connector having a center pin will often have a barrel with internal threads that receives another female connector portion having a receptacle and external threads. The barrel of the male connector rotates, and the two connectors are threaded together to insert the male center pin with the female receptacle, and then the barrel is tightened for a proper electrical connection.

The invention, as described herein, is described in the context of a typical SMA connector. However, the invention may be applied to any suitable threaded connectors that may be subject to over-torquing, such as with a wrench or other tool, and even manually. For example, the invention might be applied to N connectors, UHF connectors, and other threaded connectors. Accordingly, the present invention and the features therein are not limited to the disclosed embodiments, or to a specific type of threaded connector. Furthermore, one of the embodiments discloses a connector having male and female connector portions. Although in the disclosed embodiment both portions are illustrated as configured to form SMA connectors, one or both of the portions might be configured according to another connector standard, like an SMA to N-type adaptor for example.

FIG. 1 illustrates one embodiment of the invention, wherein connector 10 is incorporated with the counterpart mating connector 12 that may be attached to the backplane of an electronic device or equipment 14, such as a spectrum analyzer. Although a single mating connector 12 is illustrated, a plurality of mating connectors might be incorporated into the backplane of a device 14 for several cable connections. In the illustrated embodiment, connector 10 includes a male portion 16 having a center pin 18 and internal threads 20. Connector 10 also includes a female portion 22 having external threads 24, and an internal female receptacle (not shown). In a sense, the female portion 22 of connector 10 would resemble somewhat a female mating connector 12 on the equipment 14 that includes external threads 26, and a center female receptacle 28. In the embodiment of the invention, as illustrated in FIGS. 1-4C, the connector 10 essentially acts as a connector that couples with an SMA female connector and projects an SMA female connector out, away from the backplane 30 of the electronic device 14. Connector 10 acts as a torque-limiting adapter between mating connector 12 and an appropriate RF cable, to be connected to device 14 (See FIG. 2). Other adaptor configurations rather than just SMA might be used also. As such, the invention and its torque limiting features are not limited to the disclosed or illustrated embodiments.

Figure 2:
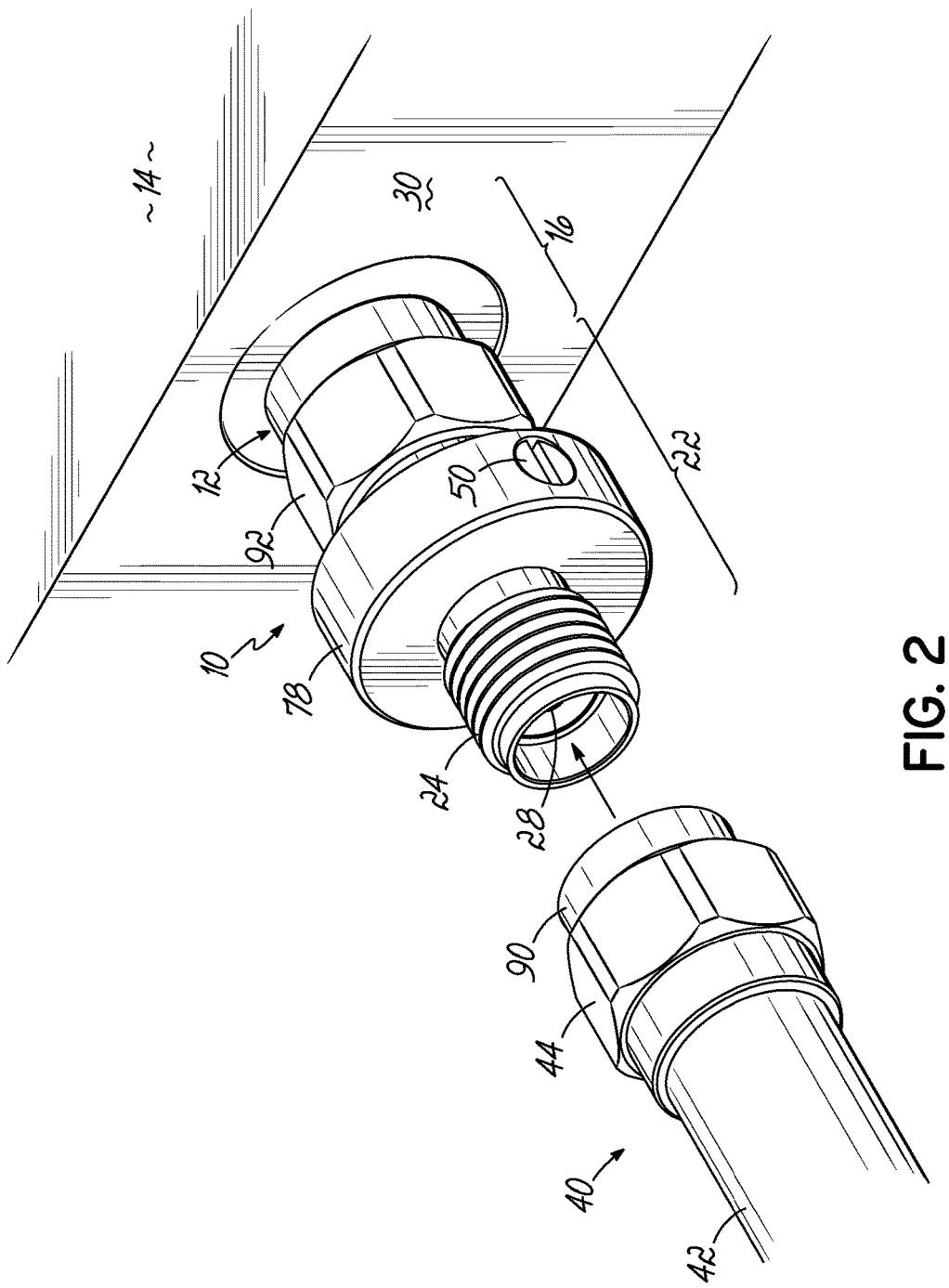
FIG. 2 is a perspective view of a cable coupled with the connector, as illustrated in FIG. 1.

Referring now to FIG. 2, the inventive connector 10 is shown secured in place on equipment 14, and ready to engage a cable 40, such as an RF cable, having conductors 42 and a male connector 44. Generally, a coaxial cable 40 will have a center conductor and outer conductor (not shown). The male connector 44 of cable 40 engages with the female portion 22 of the connector 10, and is threaded onto the external threads 24, as shown by arrow 45, to provide a secure RF connection between the cable 40 and equipment 14. The center conductor of connector 44 is received by receptacle 28 of connector 10. A tightening or torque force is applied to connector 44 to thread the connector onto the threads 24 of female portion 22. Once the connector is fully seated and tightened against connector 10, any additional torque forces are translated to the male portion 16 and connector 12. If the torque force is sufficient, if could damage the connector, but the connector 10 prevents such a scenario.

In accordance with one feature of the invention, the female portion 22 of connector 10 is configured to break away from engagement with the male portion 16 upon the application of a torque force that generally exceeds some predetermined torque force value as measure in-lb (inch pounds), for example. As discussed further herein, the amount of torque necessary to engage the torque-limiting features of the connector 10 may be adjusted or predetermined based upon materials chosen and the dimensions and configurations for shear elements and certain other portions of the connector 10. More specifically, the inventive connector 10 incorporates a shear element 50 that engages both the male portion 16 and female portion 22 of connector 10, and couples those portions together into a unitary connector structure that may be rotated as a single connector. At an interface between the female portion 22 and the male portion 16, the shear element 50 is configured to break or shear, upon the application of an overloading torque force on one portion of the connector, such as on the female portion 22 of connector 10. Once the shear element 50 is sheared or broken apart, the female portion 22 will rotate freely with respect to the male portion 16 and connector 12. Any further torque on the connector 44 and female portion 22 is no longer applied to the male portion 16, or to the respective female connector 12 on the equipment 14. Furthermore, the female portion 22 and cable 40 will disconnect from male portion 16, and equipment 14, as discussed herein.

Figure 3:
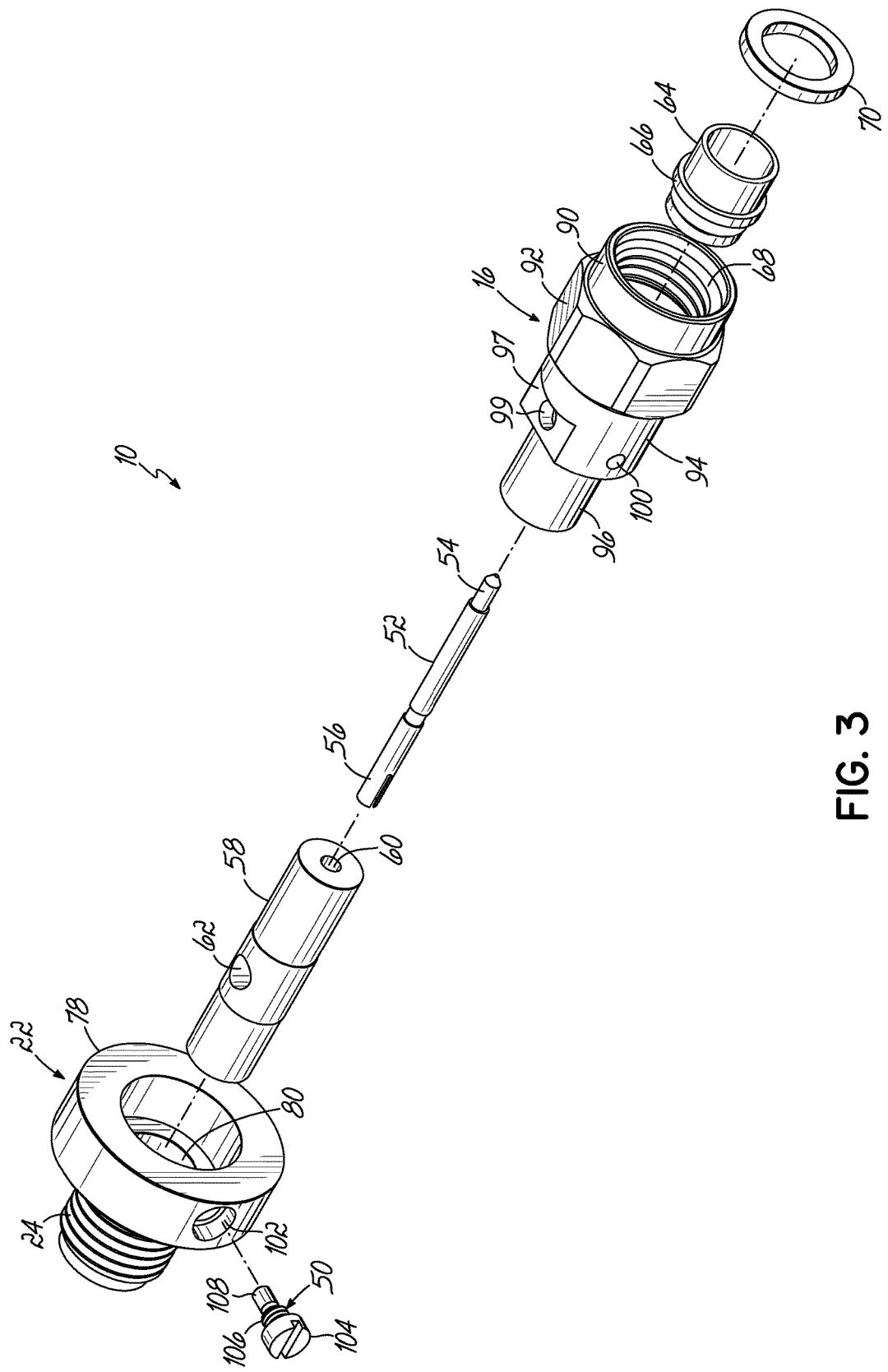
FIG. 3 is an exploded view of the embodiment of the connector illustrated in FIG. 1.

FIG. 3 illustrates one embodiment of the invention, and is an exploded view of connector 10 illustrated in FIG. 1. Referring to FIG. 3, male portion 16 and female portion 22 of connector 10 are shown disassembled from the other conductive and mechanical structures of the connector 10. Specifically, connector 10 includes a center conductor in the form of an axial conductive element 52 made of a suitable metal, such as beryllium copper. The conductive element 52 provides a male center pin 54, and a female receptacle 56. As is illustrated in cross-sectional FIGS. 4A-4C, the conductive element 52 spans between the male portion and a female portion of the connector. Conductive element 52 fits inside of a generally cylindrical insulative element 58 formed of a suitable insulation material, such as Teflon. The insulative element 58 electrically insulates the center conductor element 52 from cable outer connector (not shown), and the rest of the connector portions, such as the female and male portions that are formed of a suitable metal, such as stainless steel. When the center conductive element 52 is appropriately press fit into the insulative element 58, the center pin 54 is exposed, while the receptacle 56 is held inside the insulative element 58. The insulative element thus, includes an appropriate radial opening 60, along its length. The insulative element 58 also includes an axial opening 62 that aligns with an opening 99 in the male portion for ensuring that epoxy that flows around the center conductor during construction of the connector.

Figure 4A:
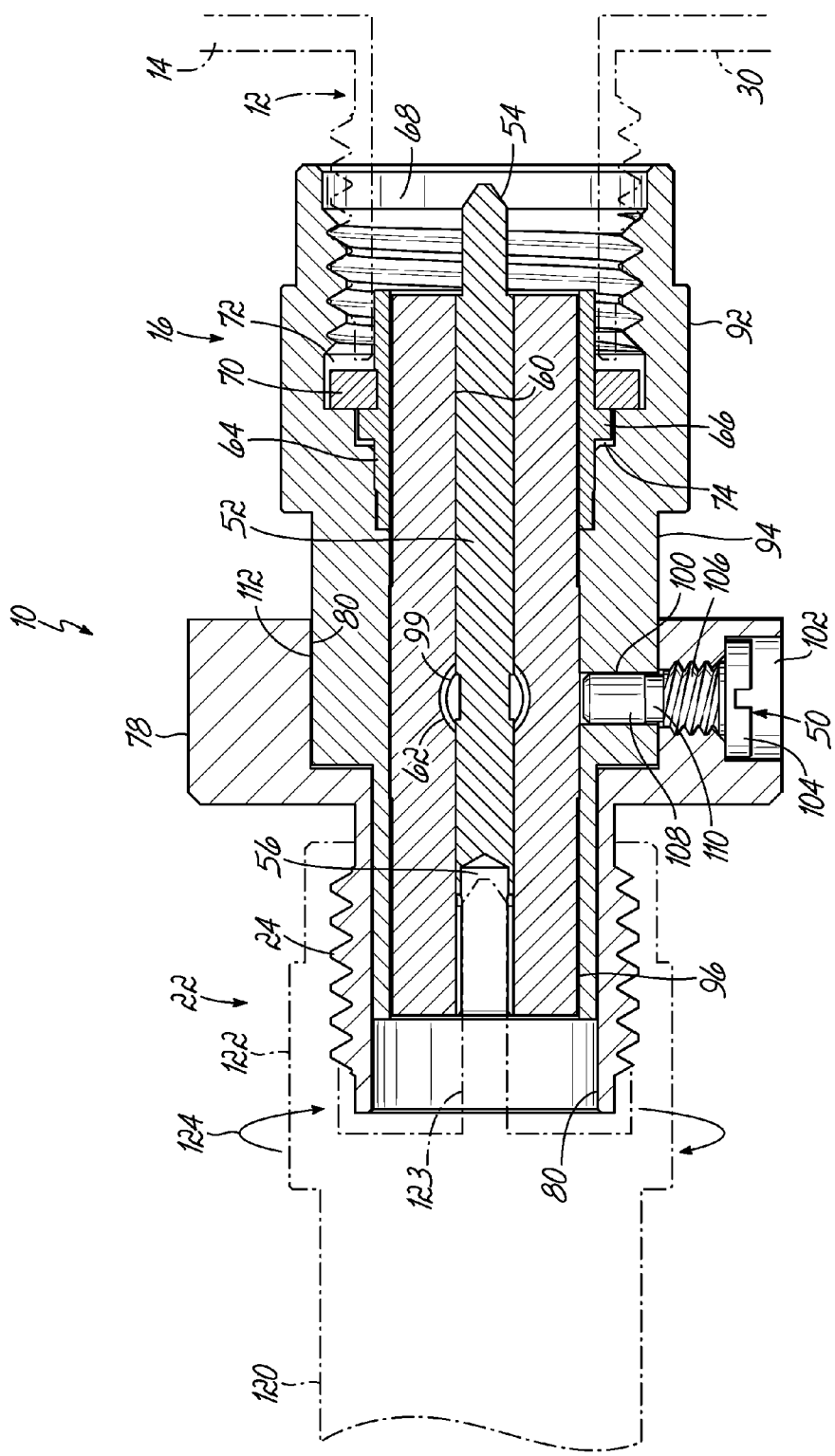
FIG. 4A is a cross-sectional view of the embodiment of the connector illustrated in FIG. 1.

For assembly of connector 10, the center conductive element 52 and insulative element 58 are inserted into the male portion 16 and seated in the female portion 22, at opposing ends of connector 10. The male portion 16 and female portion 22 each include separate bodies that are coupled together at an interface for forming a connector in accordance with features of the invention. To secure the insulative element 58 and center conductive element 52 with male portion 16, the insulative element 58 is press fit into a conductive barrel 64. Barrel 64 has a shoulder 66 formed there around for securement of the elements 52, 58, and 64 in an axial bore 68 formed in the body of the male portion 16. To secure barrel 64 along with the center conductive element 52 and insulative element 58, gasket 70 is positioned appropriately in bore 68 in an appropriately formed groove 72 (See FIG. 4A). The gasket may be made of a suitable material, such as silicon rubber. Gasket 70 is positioned in groove 72, such as by being press fit into bore 68. Then, barrel 64 is press fit into bore 68 so that the shoulder 66 seats into an appropriately sized groove 74, behind gasket 70. In that way, as illustrated in FIG. 4A, the barrel 64 and center conductive element 52 are secured. As illustrated, the conductive element 52 and insulative element 58 are appropriately dimensioned in length and diameter to fit into bore 68 and present the receptacle 56 at one end (the female end), and the male center pin 54 at the other end (the male end).

Turning again to FIG. 3, the female portion 22 includes a body having external threads 24 adjacent to and coupled with a shear collar 78. The body of female portion 22 includes an internal bore 80 that is dimensioned to receive sections of the male portion 16 of the connector. More specifically, as illustrated in FIGS. 3 and 4A-4C, the bore 80 is dimensioned with different inner diameter dimensions in the threaded section 24 and in the shear collar 78. Thus, the female portion 22 and bore 80 are configured to receive differently dimensioned (outer diameter) sections of the male portion 16 for rotatable coupling.

Referring to FIG. 3, the outer surface and configuration of the body of the male portion 16 defines a front section 90, a nut section 92, an intermediate section 94, and a rear section 96, opposite the front section 90. All the sections 90, 94, and 96 of the illustrated embodiment have rounded outer surfaces, while nut section 92 has one or more flat surfaces, and as illustrated is hex-shaped for being tightened onto female mating connector 12. Rear section 96 is dimensioned to engage bore 80 proximate the threaded section 24 of the female portion 22, as illustrated in FIG. 4A for when the portions 16, 22 are brought together. The intermediate section 94, on the other hand, is dimensioned to engage the bore 80 proximate the shear collar 78 when the portions are brought together. As discussed herein, the portions 16, 22 are rotatably coupled or joined together at an interface so the portions, when free, may rotate with respect to each other. More specifically, the outer diameter of the intermediate section 94 and the inner diameter of shear collar 78 are configured so that shear collar 78 would rotate around the male portion 16 and specifically around the intermediate section 94 and fall apart when sheared. Normally, when the connector is formed, the portions 16, 22 are brought together to engage at the interface and are then coupled together as a unitary connector to prevent rotation with respect to each other or separation from each other as discussed herein. Then, if a shear occurs, the male and female portions of connector 10 are sheared apart and decoupled and the shear collar may again rotate around the male portion. The previously joined male and female portions forming the connector are configured for being separated when sheared apart.

In accordance with one aspect of the invention, to initially prevent such rotation, and to couple the male portion 16 and female portion 22 together as a unitary structure for forming the connector 10, each of those portions 16, 22 include first and second cavities 102, 100 that extend radially in the portions as shown. The first and second cavities 102, 100 are configured for being aligned when the male and female portions 16, 22 are joined together. The cavity 102 extends radially in and through the shear collar 78 as illustrated. The cavity 100 extends radially in and into the intermediate section 94. More specifically, as illustrated in FIG. 4A, female portion 22 including shear collar 78 may be rotated about the rear intermediate sections 94, 96 in order to align the cavities 102, 100 at an interface 112. The interface 112 extends longitudinally and is defined between the joined connector portions and the aligned cavities 102, 100. Once those cavities are aligned, the shear element 50, in the form of an elongated threaded shear pin, is inserted into the aligned cavities and spans radially and perpendicularly across the longitudinal or axial extending interface 112 and between the male and female portions to engage both portions. The shear pin 50 may take a number of different forms. The shear pin may be threaded or press fit into engagement with one or more of the cavities to secure the shear pin and join the male and female portions to form the connector.

Figure 4B:
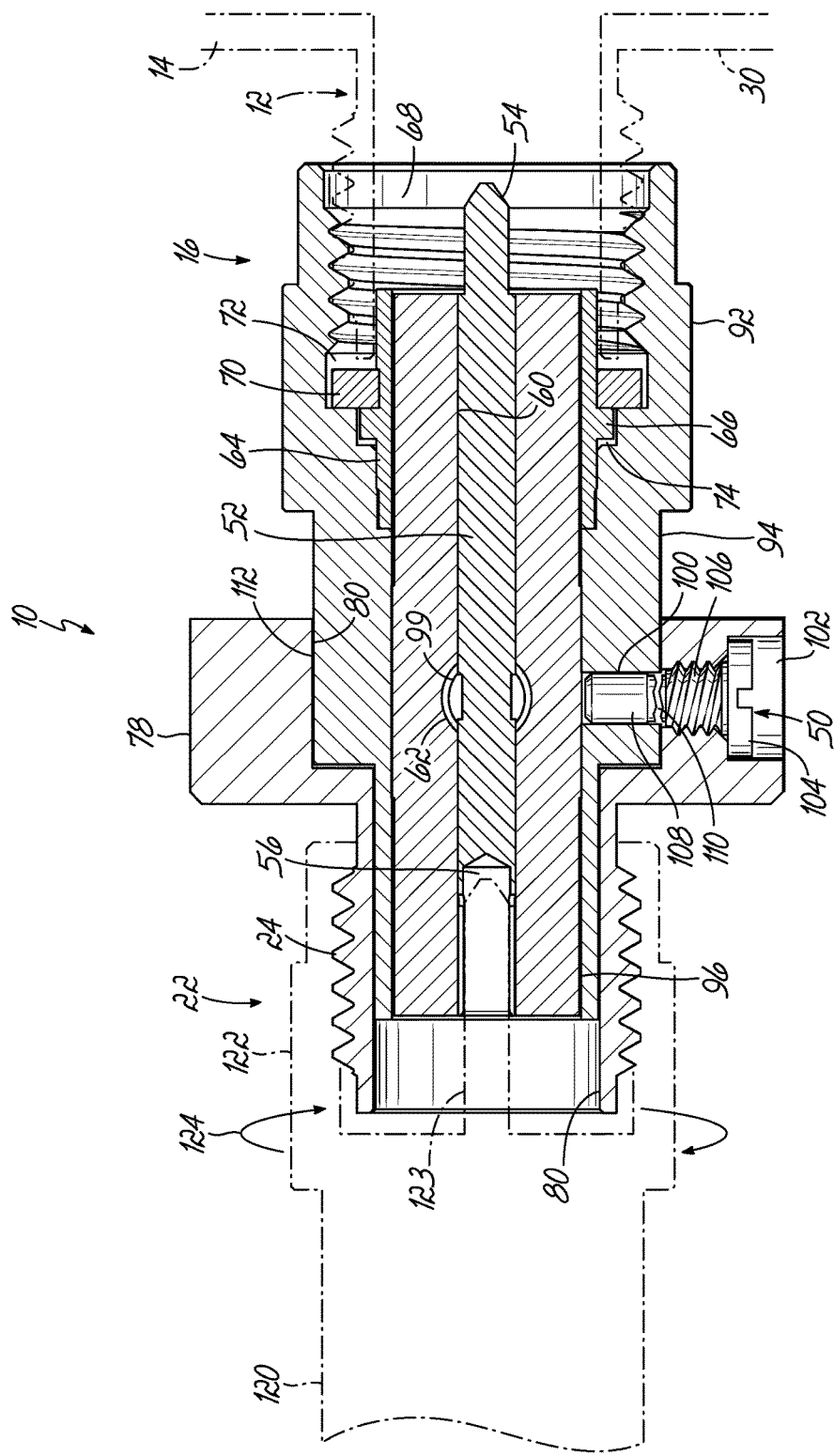
FIG. 4B is a is a cross-sectional view of an embodiment of the connector, as shown in FIG. 1, showing the results of a shear force.
Figure 4C:
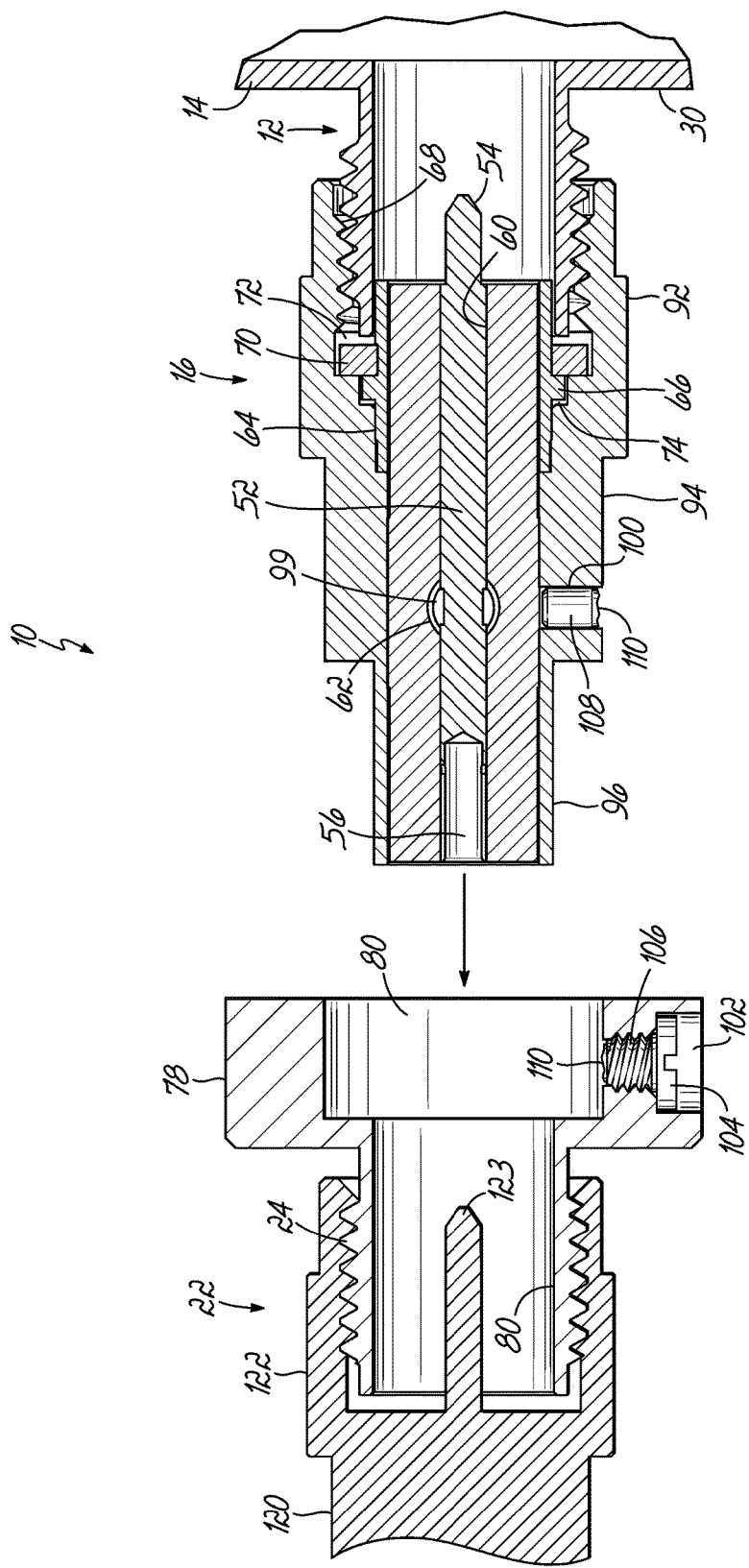
FIG. 4C is a cross-sectional view of the embodiment of the connector, as shown in FIG. 1, showing separation of elements of the connector after a shear condition.

In one example, as illustrated herein, the shear pin might be threaded into place. In another embodiment, the shear pin might be press fit into the aligned cavities. Referring to FIG. 4A, the shear pin 50 as illustrated is threaded and includes a head 104, external threads 106, and a pin section 108. The shear pin 50 also includes a breakable or shearable shear section 110 positioned between the threads 106 and the pin section 108. Shear section 110 is radially aligned with the interface 112 and is configured to break or shear upon the application of a significant rotational or torque force (shear force) applied at the interface 112, between the shear collar 78 of the female portion 22 and intermediate section 94 of the male portion 16. A sufficient shear force at the interface 112, such as would be provided by a torque force on the female portion 22 of the connector from a cable connector 44 being tightened, causes the shear pin to break, as illustrated in FIGS. 4B and 4C, and discussed further hereinbelow. Generally, the shear pin is dimensioned so that when fully seated in the aligned cavities 100, 102, the shear section 110 aligns radially with the interface 112.

Head 104 may be appropriately formed for engagement by a flathead or Phillips head screwdriver, or some other appropriate driving device for threading the shear pin 50 and the threads 106 into engagement with internal threads provided in the cavity 102 on the shear collar 78, as shown in FIG. 4A to secure the shear pin and join the portions to form the connector. The shear pin might also be press fit into one or both of the cavities and the pin, and cavities may be shaped and dimensioned to affect the press fit. If the shear pin is press fit, it may not be necessary to have a larger head for a screwdriver and the pin might be pressed or hammered into engagement. In such a case the cavity in the female section might resemble cavity 100 in the male section. When the shear pin 50 is properly and fully seated, the threads 106 are positioned in the shear collar 78, while the pin section 108 is positioned in the cavity 100 of the male portion intermediate section 94. The shear section 110 then spans interface 112. When the shear pin 50 is seated, the male portion 16 and female portion 22 are coupled and joined together so that the connector 10, as illustrated in FIG. 1, is a unitary structure.

Referring now to FIGS. 4A-4C, the action of the inventive connector is illustrated. As shown in FIG. 4A, connector 10, and specifically the male portion 16 of connector 10, is secured to female connector 12, such as on equipment 14. Male portion 16 of connector 10 is rotated utilizing an appropriate wrench or other tool on the nut section 92 of the male portion 16. In accordance with one aspect of the invention, the nut section 92 is configured to have a different dimension from the typical dimension for the type of connector that the inventive connector 10 characterizes. For example, in the illustration shown in FIG. 1, connector 10 characterizes a connector that is configured for use with another connector of a specific connector standard, such as typical SMA connector. That is, for one embodiment, the male and female portions that come together are configured and dimensioned to form an SMA connector that operates with other standard SMA connectors. However, in accordance with one aspect of the invention, one or more sections of the connector are not standard. For example, a nut associated with a typical SMA connector standard incorporates a 5/16 inch hex nut (or 0.3125 inches). However, in the present invention, the hex nut dimension of nut section 92 is different or is non-standard. In the disclosed embodiment, it is larger, at approximately 0.330 inches, than the typical SMA standard nut. The nut section has a dimension different from a nut associated with the specific connector standard to deter further rotation of the male portion once it is attached to the female connector.

As such, in one embodiment of the invention, connector 10 must be secured to equipment 14 utilizing a non-standard or special wrench or tool for engaging the non-standard connector nut section. This is to prevent a user from further tightening connector 10 at the nut section 92 with a standard SMA wrench once it has been installed on the female connector 12 attached to equipment 14. In one embodiment of the invention, the nut section 92 might be tightened to 12 pound-inches (lb-in) on the female connector.

Once connector 10 is secured, it presents the female portion 22 at the other end for connection with a cable 120, as illustrated in FIG. 4A. Cable 120 is terminated with the typical SMA male connector 122 having a typical 5/16 inch hex nut. The male connector 122 of cable 120 is secured appropriately to the female portion 22 of connector 10 to thus, connect cable 120 to the equipment 14 through connector 10. Torque is applied, as illustrated by rotation along arrow 124, to connector 122. When the connector 122 is fully seated and threaded on female portion 22, that torque is then translated to the female portion 22, including the threads 24 and the shear collar 78.

Because the female portion 22 is coupled to male portion 16 at interface 112 through the shear pin 50, the torque force is also translated to the shear pin and to the male portion 16. This would tend to further tighten the connector 10 onto connector 12. If the torque force is high enough, damage may result to connector 12 and device 14. However, in accordance with features of the invention, such damage is prevented.

Although a torque force of some predetermined amount or range is desirable for connecting cable 120, if the torque force, as applied, exceeds that amount or range, the shear pin 50 will break, or shear, at shear section 110, as illustrated in FIG. 4B. For example, any torque force over 8 inch pounds might cause a shear to occur. The invention is not limited to a specific torque force for causing shear and any suitable value that would prevent damage to equipment 14 and connector 12 might be selected as appropriate. For example, the connector might be configured to have a shear value in the range of 8-15 inch pounds.

The shearing torque force is applied at the interface 112 by the force on the female portion 22 applied at connector 122, that is resisted by the opposite force on male portion 16 that is already tightly seated against connector 12. When this shearing of pin 50 occurs, the female portion 22 and male portion 16 of connector 10 are no longer mechanically coupled together. Additional rotational or torque force along the direction of arrow 124 will then only spin the female portion 22 and shear collar 78 around the male portion 16. Generally, no further rotational force is applied to the male portion 16 or connector 12. Furthermore, the cable 120, now connected to the female portion 22, may be separated and pulled away from the male portion 16, and equipment 14, as illustrated in FIG. 4C. In that way, damage to the female connector 12 and equipment 14 is prevented from an excessive torque force applied to connector 122 of cable 120. Generally, a portion of the shear pin, including the head 104 and the threads 106 will remain in female portion 22, and particularly in cavity 102 of the shear collar 78, as illustrated in FIG. 4C. The pin section 108 may generally remain in the cavity 100 formed in the male portion 16.

Since connector 10 is rendered inoperable by shearing apart the male and female portions, it may be desirable to remove the male portion 16 from equipment 14, and begin again with connecting a cable to connector 12. To that end, as illustrated in FIG. 3, male portion 16 incorporates a flattened section 97 formed on the outside surface of the intermediate section 94. Flattened section 97 also incorporates the bore 99 that aligns with the bore 62, in the insulative element 58, as illustrated in FIGS. 4A-4C for epoxy flow around the center conductor. Flattened sections 97 are formed on opposing sides of the intermediate section 94, although only one flattened section 97 is illustrated in FIG. 3. An appropriate wrench may then be utilized against the flattened sections 97 for unthreading a male portion 16 from female connector 12 and equipment 14. For example, a 7/32 inch wrench may be used to remove the male portion 16 from female connector 12 and equipment 14. Then, if desired, another connector 10 may be secured to connector 12 for the purposes of protecting equipment 14, as discussed herein. Accordingly, the present invention provides protection to connectors, and particularly to high precision connectors, that are often attached to expensive and sensitive equipment 14. No special torque wrenches are necessary to prevent over-torquing and damage to the connector 12 and equipment 14. Rather, connector 10 ensures that any high torque forces are absorbed by shear pin 50 to then decouple female portion 22 from male portion 16, and prevent further over-torquing and damage.

In the embodiment of FIGS. 1-4C, only a single shear pin 50 is illustrated. However, multiple shear pins 50 might be used with the connector including multiple sets of aligned cavities 100, 102. Also, as disclosed, the connector 10 is illustrated with the male portion 16 coupled to equipment 14 and the female portion coupled with the cable 120. However, the arrangement might be reversed wherein the equipment includes a male connector and the cable has a female connector.

Figure 5:
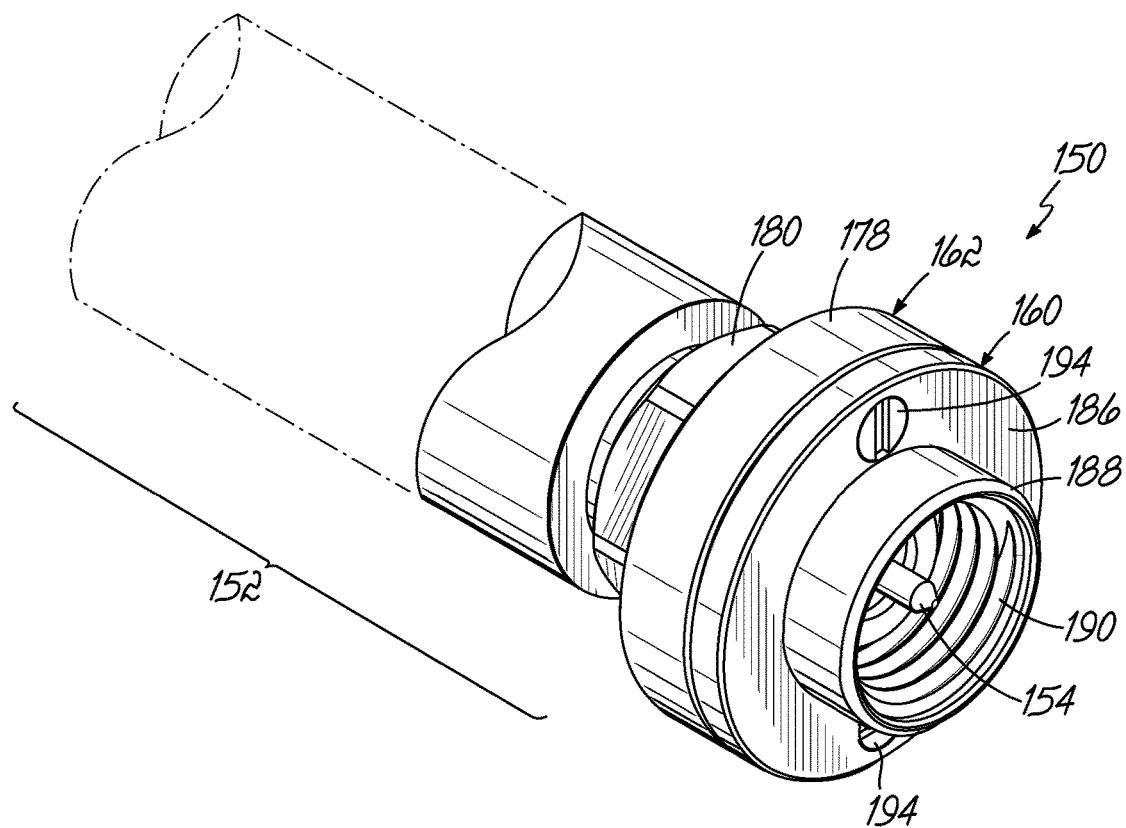
FIG. 5 is a perspective view of an alternative embodiment of a connector of the invention.

FIGS. 5-7B illustrates an alternative embodiment of the invention of a connector that provides a limitation to or prevents damaging over-torque forces that may damage equipment to which a cable is attached. Referring to FIG. 5, a connector 150 is shown coupled with a cable 152. The cable may be a suitable coaxial cable, or other cable. In the illustrated embodiment of FIGS. 8-10B, the cable is a coaxial cable that presents a signal through a center conductor, or center pin 154, at the end of the cable, as illustrated in the drawings and similar to other conductors as described herein. Generally, such coaxial cables will also have an outer conductor (not shown) that interfaces with the outer metal portions of a connector 150 to complete the circuit, as understood a person of ordinary skill in the art. For separation of the center conductor 154 and the outer conductor, generally an insulative structure 156 will surround the center conductor 154 along the cable and through the connector (See FIG. 6).

In accordance with one aspect of the invention, connector 150 includes torque-limiting features to prevent over-torquing or over-tightening of connector 150, such as on equipment. Similar to other embodiments disclosed herein, the connector of FIGS. 5-7B is directed to an SMA connector design, although the features of the invention may be utilized with other threaded connector designs that are subject to being over-torqued, and so the present invention is not limited to SMA configurations. The embodiment of FIGS. 5-7B is shown configured to terminate a cable but could be configured similarly to the embodiment of FIG. 1 and may present a female connector at the opposite end rather than being coupled with a cable. Referring to FIGS. 5-7B, connector 150 includes a lock nut portion 160, a coupling nut portion 162, and a cable portion 164 that interfaces with the end of cable 152 and couples together with the coupling nut portion 162. The cable portion 164 is secured or fixed appropriately to the end of a cable 152, and with the inner and outer conductors of the cable (alternatively it could be coupled to form a female connector as shown in FIG. 1). The various portions 160, 162, 164 may be formed of a suitably conductive material, such as stainless steel. Cable portion 164 has a bore 166 formed therein for receiving the center conductor 154, insulative structure 156, and any outer conductor (not shown), and presenting the center conductor 154 at the face of the conductor, as illustrated in FIG. 5 and FIGS. 7A-7B. As such, in the embodiment illustrated in the figures, connector 150 forms a male connector to be threaded onto an appropriate female connector, like connector 12.

Referring to FIG. 7A, the cable portion 164 of the connector 150 includes a groove 170, and an appropriate ring 172 that fits in the groove. The coupling nut 162 also includes a groove 174 so that the coupling nut portion 162 may be press fit onto the cable portion 164, and captured by ring 172 in the aligned grooves 170, 174, as illustrated in FIG. 7A. In that way, the coupling nut portion 162 is secured with cable 152 and rotatably engaged with the cable portion and cable.

The coupling nut portion 162 includes a collar 178, and a nut section 180 for rotating the coupling nut portion 162 along with the lock nut portion 160, and securing the connector 150 to an opposing female connector. As such, the coupling nut portion 162 rotates around cable portion 164, as illustrated in FIG. 7A by arrow 182.

Figure 6:
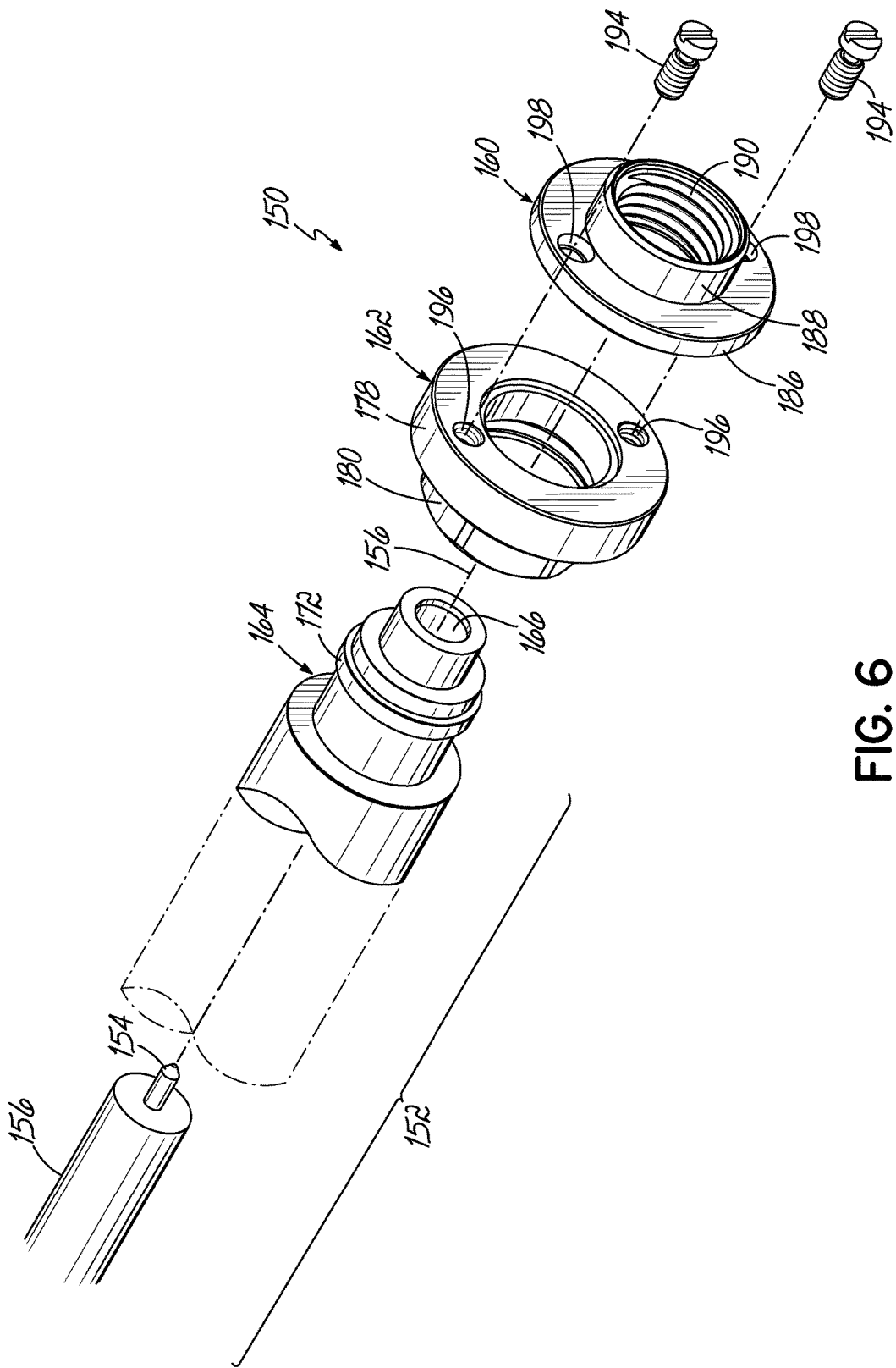
FIG. 6 is an exploded view of the embodiment of the connector illustrated in FIG. 5.
Figure 7A:
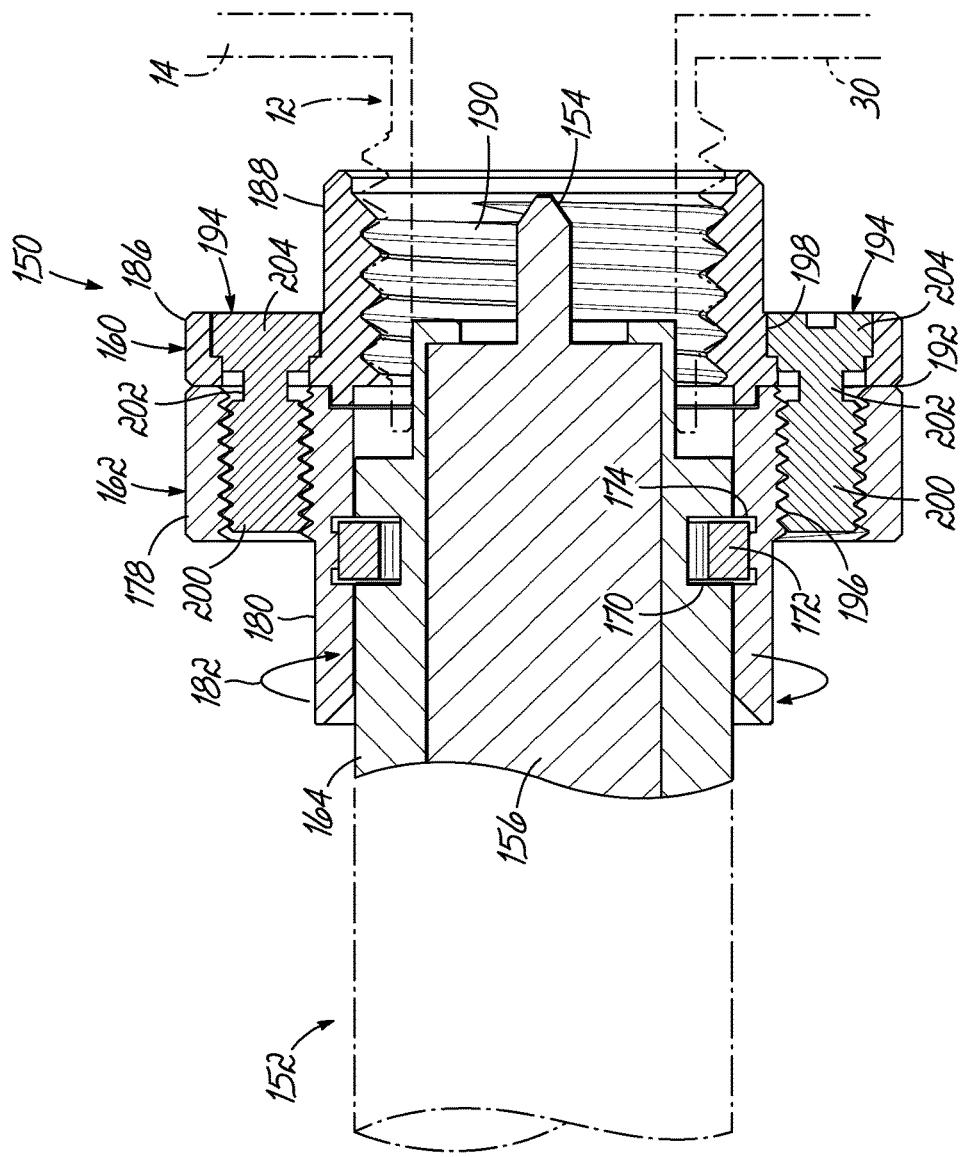
FIG. 7A is a cross-sectional view of an embodiment of the connector illustrated in FIG. 5.
Figure 7B:
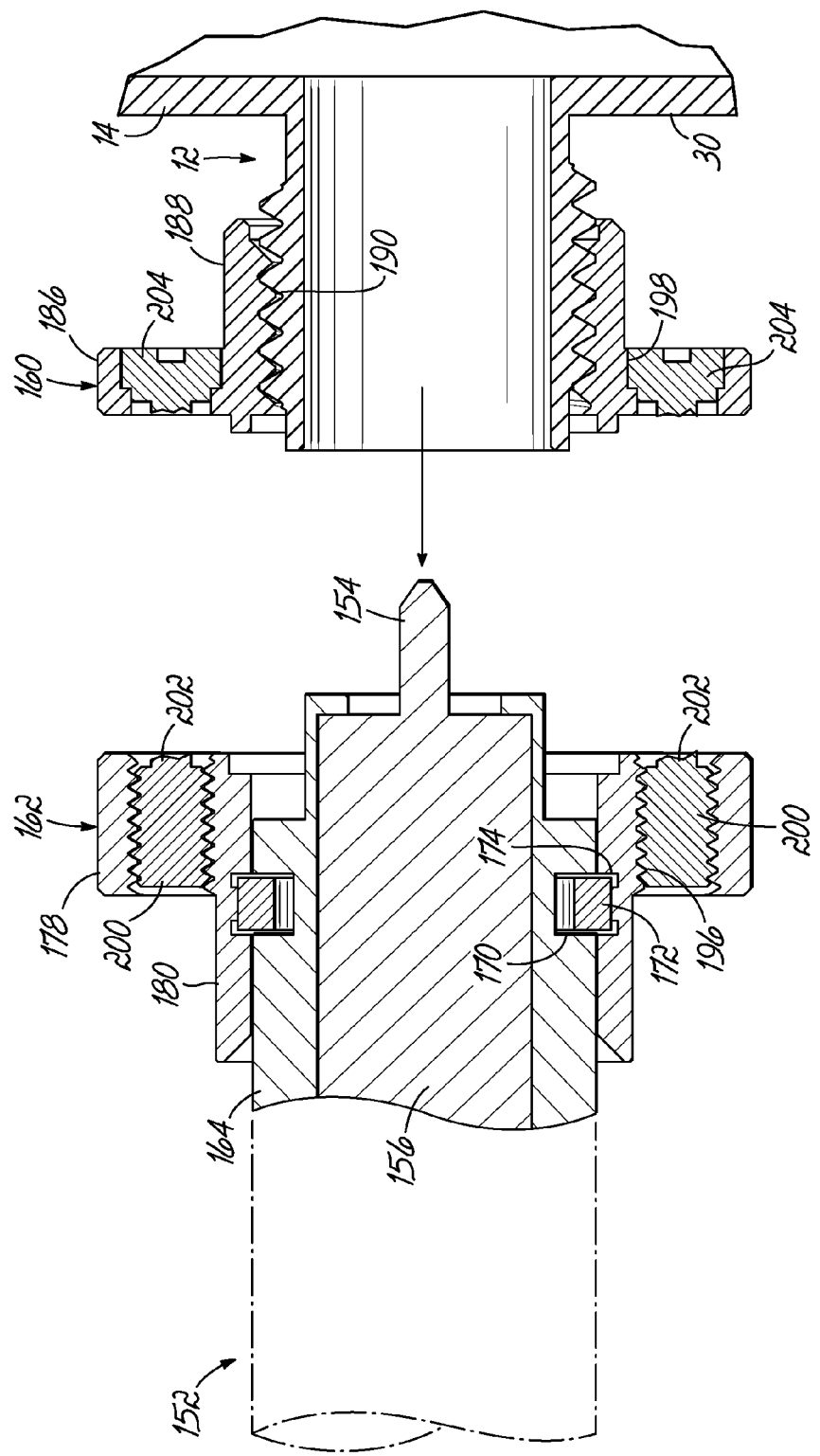
FIG. 7B is a cross-sectional view of an embodiment of the connector as illustrated in FIG. 5 after a shearing condition.

Referring to FIGS. 5 and 6, the lock nut portion 160 has a collar 186 that is dimensioned and configured to align with collar 178, and also includes a threaded section 188 that has internal threads 190 to engage with threads of another connector, such as a female connector, when connector 150 is threaded and rotated. FIG. 7A shows the connector 150 connected to female connector 12, coupled to equipment 14.

The lock nut portion 160 and coupling nut portion 162 seat together in a rotational engagement at an interface 192, as shown in the figures. The lock nut portion 160 and coupling nut portion 162 are separable from each other and freely rotatable with respect to each other at the interface until secured together. Normally, when the connector is formed, the portions 160, 162 are brought together to engage at the interface and to be rotatably coupled together at the interface such that the coupling nut portion can rotate with respect to the lock nut portion. Then they are joined together as a unitary connector to prevent rotation with respect to each other or separation from each other as discussed herein. Once joined into a unitary connector, the two portions 160, 162 are then rotated together as a connector on the cable.

As illustrated the portions are coupled together by shear pins 194 that fit into one or more appropriate cavities, such as first and second cavities 196, 198 formed to extend generally axially in the coupling nut portion 162, and lock nut portion 160, respectively with respect to the axis of the connector as illustrated by reference axis 156. As noted herein, the shear pins may take various different forms such as threaded pins, as illustrated. The shear pin may be threaded or press fit into engagement with one or more cavities to secure the shear pin and join the portions to form the connector.

The shear pins 194 might be press fit into one or both of the aligned cavities, wherein the cavities are not threaded in any portion but rather are dimensioned and shaped to receive a pressed shear pin. As illustrated, the shear pins 194 each include a threaded section 200 with external threads, a shear section 202, and a head 204. The cavities 196 of the coupling nut portion 162 include internal threads for receiving the threaded section 200. The head 204 and cavity 198 are appropriately configured so that the heads seat within the appropriate cavity so the pin 194 extends longitudinally and perpendicular to the radially extending or spanning interface 192. The shear section 202 then aligns with and spans the interface 192 between coupling nut portion 162 and lock nut portion 160. The interface 192 is generally a radial or radially extending interface that extends radially from the center of the connector, unlike the embodiment of FIGS. 1-4C that has an interface that extends longitudinally or axially along the connector. In the illustrated embodiment, the cavities are positioned at 180° positions around the connector. A greater or lesser number of cavities may be utilized, and the orientation around the connector may also be varied, as desired.

The respective portions 160, 162 are secured together in connector 150 as a unitary structure and prevented from rotating with respect to each other at the interface. Rather, the unitary connector is configured to rotate around cable portion 164 together. As such, as illustrated in FIG. 7A, when nut section 180 is rotated or torqued utilizing an appropriate wrench or other tool, the rotational force is provided to lock nut portion 160 and to the threaded section 188 for threading and securing connector 150 to another connector 12, such as a female SMA connector. The torque force is provided at coupling nut portion 162, and is translated to the lock nut portion 160 and threads 190 through interface 192 and shear pins 194. Once the connector 150 is seated and tight on the connector, any excess torque or rotational forces are translated to connector 12.

For the prevention of over-torquing and subsequent damage to connector 12 and/or equipment 14, if the torque force exceeds a predetermined value, a shearing event occurs. The force is provided to nut section 180, and if the connector 150 is fully seated, a shear force is created at interface 192 that is borne by the shear section 202 of shear pin 194. Further tightening creating a torque force for example that exceeds 8 inch pounds will break or shear the shear pin 194 proximate to shear section 202 and interface 192, as illustrated in FIG. 7B. For example, any torque force over 8 inch pounds might cause a shear to occur. The invention is not limited to a specific torque force for causing shear and any suitable value that would prevent damage to equipment and/or a connector might be selected as appropriate. For example, the connector might be configured to have a shear value in the range of 8-15 inch pounds.

This shearing action decouples the lock nut portion 160 from the coupling nut portion 162 and connector 12, and so any additional rotational force on coupling nut 162 would be dissipated as a free rotation of the coupling nut portion on cable 152 without additional rotation of the lock nut portion 160 and threads 190. That is, the shearing, or breaking, of pin 194 at the interface 192 will prevent any additional torquing force on the threaded section 188, or on the threads of female connector 12. Accordingly, over-torquing and damage to connector 12 and equipment 14 is avoided in accordance with the invention.

Additionally, as illustrated in FIG. 7B, once the lock nut portion 160 and coupling nut portion 162 are decoupled, they can be separated, thus, separating cable 152 from connector 12, and also from the lock nut portion 160 of the connector 150. The lock nut portion 160 and essentially the head of shear pin 194 remain on the connector 12. The coupling nut portion 162 and the threaded section of the shear pin 194 remain with cable 152, and the cable portion 164 that secures the coupling nut portion with cable 152. In that way, connector 150 is part of the cable construction. The lock nut portion 160 could then be appropriately removed from female connector 12, and the process repeated for a proper cable connection without over-torquing the connector 150. Any damage done by over-torquing the connector 150 is done to the connector itself, rather than to connector 12 and equipment 14. The embodiment of FIGS. 5-7B illustrate 2 shear pins; however a greater or lesser number of shear pins and appropriate cavities might be suitable for the invention as described.

Figure 8:
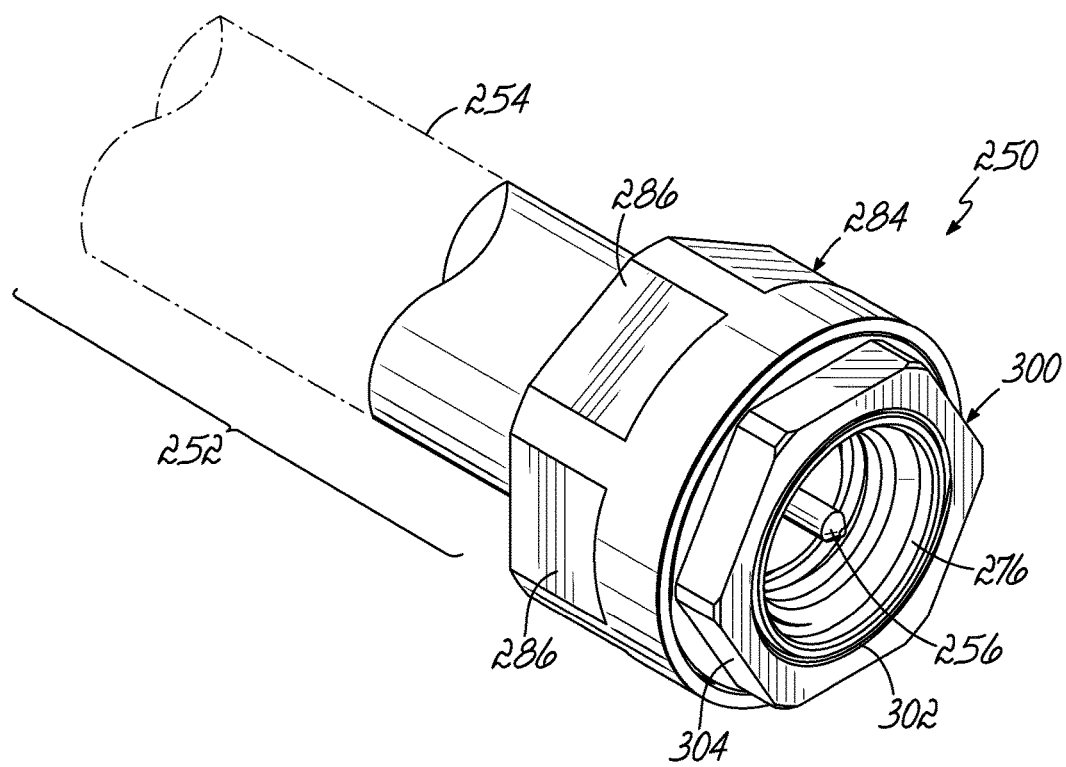
FIG. 8 is a perspective view of a connector of the invention.
Figure 9:
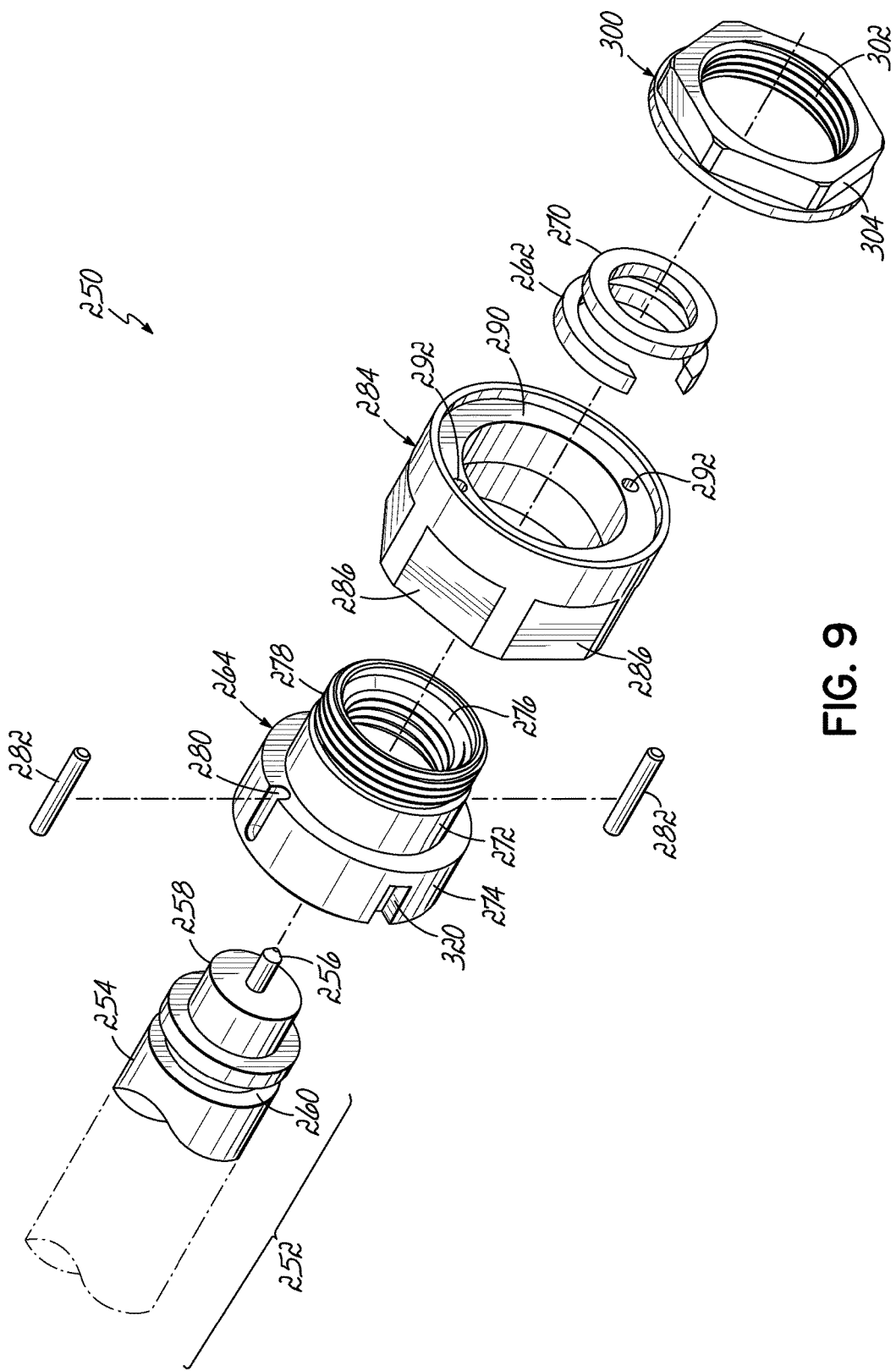
FIG. 9 is an exploded view of the embodiment of the connector illustrated in FIG. 8.
Figure 10A:
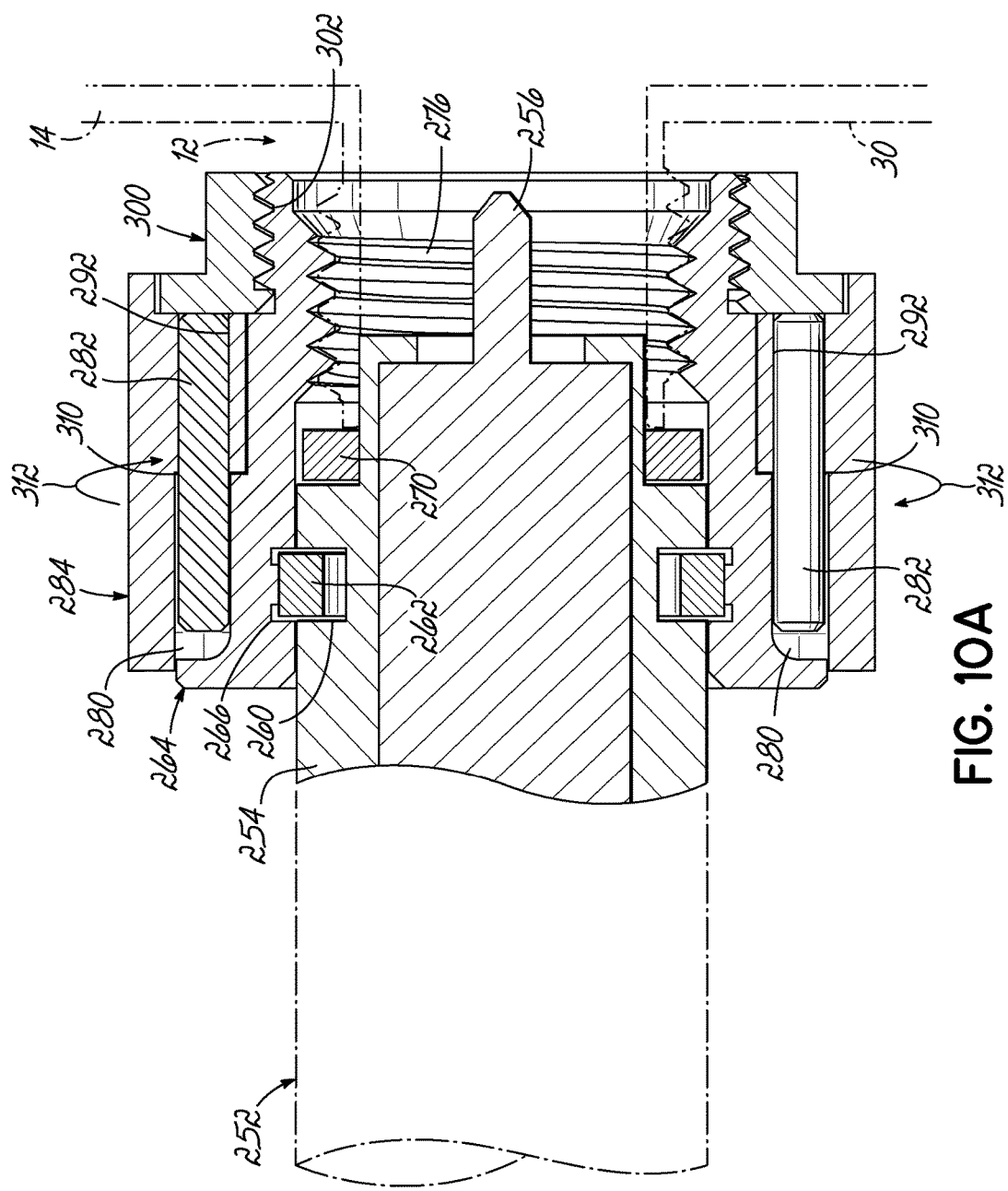
FIG. 10A is a cross-sectional view of an embodiment of the connector illustrated in FIG. 8.
Figure 10B:
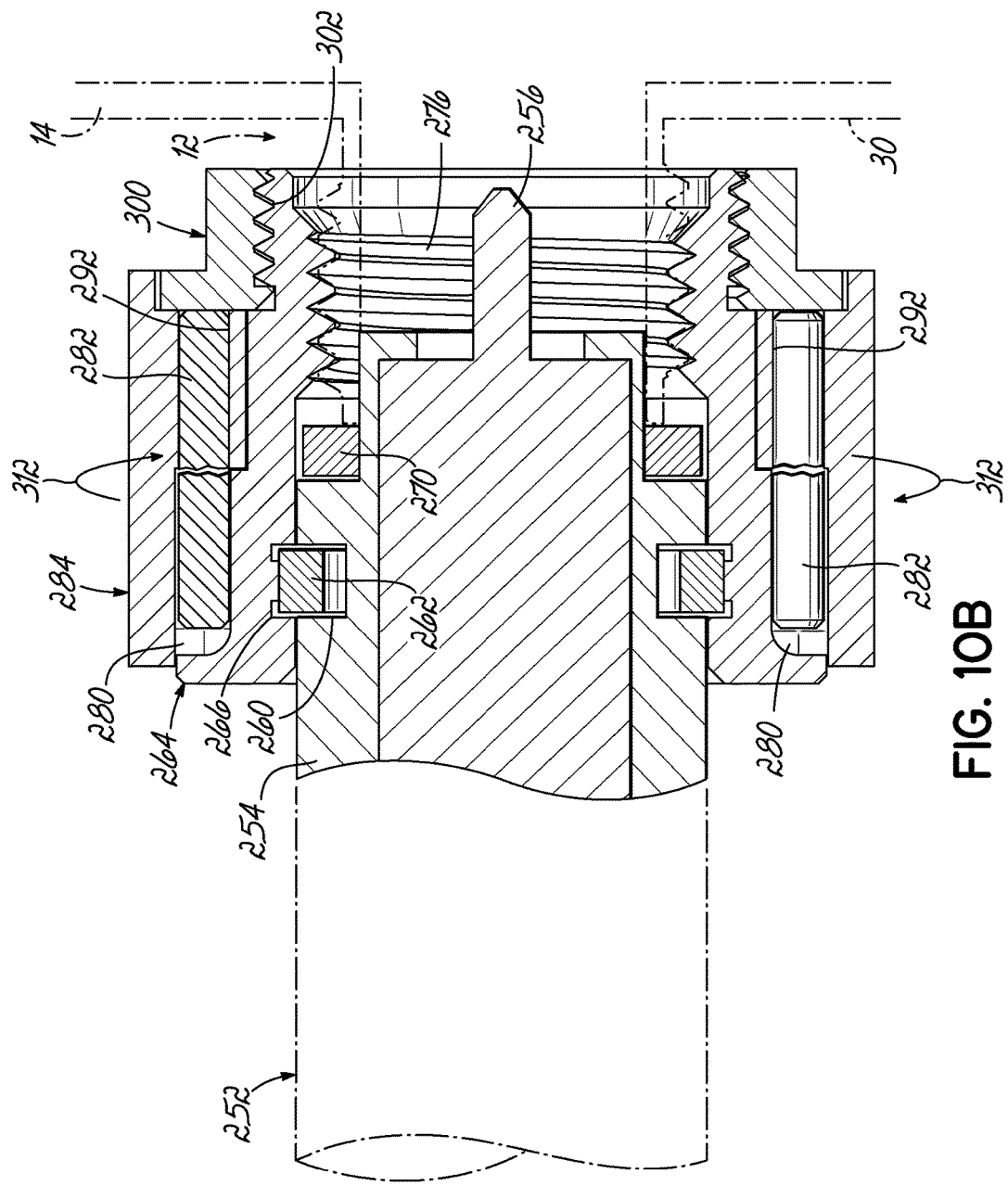
FIG. 10B is a cross-sectional view of an embodiment of the connector illustrated in FIG. 8 after a shearing condition.

FIGS. 8-10B illustrate another alternative embodiment of a connector utilizing features of the invention. Referring to FIG. 8, connector 250 is shown terminating a cable 252. Connector 250 has torque-limiting features, along the lines of the invention, as described herein. Connector 250 couples appropriately to cable 252. In the disclosed embodiment, connector 250 is compatible with other SMA connectors, and thus, acts as essentially a male SMA connector, with the appropriate configurations and threads for coupling to a female SMA connector, as illustrated in FIGS. 10A-10B, but the invention is not limited to SMA connectors. Furthermore, connector 250 might be arranged with a female portion opposite the male portion, as illustrated in FIG. 1, rather than terminating a cable as shown in FIG. 8.

Referring to FIG. 9, an exploded view of the connector 250 is illustrated. Connector 250 includes a cable section 254 that couples appropriately with the inner and outer conductors of coaxial cable 252, and specifically with the center conductor 256, insulative structure 258, and an outer conductor (not shown) to provide proper electrical signals at the interface with connector 250. As with other embodiments herein, the invention and the connector having torque-limiting features is not itself limited to a specific cable construction, or the way in which connector 250 interfaces with a cable 252. That is, the connectors of the invention may be interfaced appropriately with the cable so that the various cable conductors and signals thereon are appropriately presented at the connector face.

In the illustrated embodiment, the cable section 254 has an appropriate groove 260 to hold a lock ring 262. A coupling nut portion 264 also has an appropriate aligned groove 266 so that the coupling nut portion 264 may be secured with cable section 254 and cable 252, as illustrated in FIGS. 10A-10B. With a lock ring in place, the coupling nut portion 264 may be press fit or otherwise fixed onto cable section 254. The coupling nut section thus secured would then rotate freely on cable section 254, and rotate with respect to cable 252. The lock ring may be formed of beryllium copper. Also, a gasket 270 might be utilized, as illustrated in FIG. 9, and would seat against a surface of the cable section 254, as illustrated in FIGS. 10A and 10B.

Referring again to FIG. 9, the coupling nut portion 264 includes a threaded section 272, and a shear collar 274 positioned rearwardly of the threaded section. The threaded section includes internal threads 276 for forming essentially the male connector to be threaded onto the female connector 12, as illustrated in FIGS. 10A-10B. The threaded section 272 also includes external threads 278 for construction of the connector 250, as discussed below. Formed within shear collar 274 are pin slots 280. In the illustrated embodiment, there are two pin slots, and they are positioned at 180° positions around the shear collar 274. A greater or lesser number of pin slots may be utilized, and the orientation around shear collar 274 may also be varied, as desired. The pin slots 280 are each configured to receive appropriate shear pins 282. The slots 280 and pins 282 are configured and dimensioned so that a portion of the shear pins engage with the coupling nut portion 264, and a portion of the shear pins engages with a coupling nut sleeve 284, as illustrated and disclosed herein.

Referring to FIG. 9, the coupling nut sleeve 284 is barrel-shaped for fitting over the coupling nut portion 264 for rotatably coupling the sleeve 284 and portion 264 together. The various elements, including 264, 284, 300 may be made of a suitable conductive material such as stainless steel. Externally, the coupling nut sleeve includes flattened nut surfaces 286 for being engaged by a wrench or tool to tighten the male connector 250 onto a connector 12. Internally, around an inner surface 288, a pin ring 290 is formed. The pin ring 290 includes one or more pin cavities 292 for receiving a portion of the sheer pins 282 when a connector is assembled. More specifically, the pin cavities 292 are aligned with the pin slots 280, when the coupling nut sleeve 284 is rotatably coupled together with the coupling nut portion 264. The shear pins are placed between the portion 264 and sleeve to join those elements as a unitary connector that is rotated as a unitary element, as illustrated in FIGS. 8 and 10A-10B. During assembly of the connector, with the pins 282 positioned in the slots 280, the coupling nut sleeve 284 may be aligned as elements 264, 284 are brought together so that the cavities 292 align with the slots 280, and receive the remaining or exposed portion of the shear pins 282. As shown in FIGS. 10A-10B, the pins span between the elements 264, 284 at an interface 310.

To then secure the coupling nut sleeve 284 to the coupling nut portion 264, a lock nut 300 having internal threads 302 is threaded onto the external threads 278 of the coupling nut section. This captures sleeve 284. To that end, the outer diameter of the external threads 278 of the coupling nut section are configured to pass through the inner diameter of the pin ring 290, and be exposed on one side of the coupling nut sleeve 284. Lock nut 300 is then threaded onto the coupling nut threads 278, and abuts against the pin ring 290 to push and hold the coupling nut sleeve into engagement with the coupling nut portion 264, with the shear pins in place. For tightening the lock nut 300, it includes flattened nut surfaces 304. Once the lock nut 300 is in position, the coupling nut portion 264, coupling nut sleeve 284, and lock nut 300 form a unitary structure that is able to rotate as a connector on cable section 254 for tightening the male connector 250 with a female connector 12, as illustrated in FIGS. 10A-10B. A illustrated in FIG. 10A, center conductor 256 is presented at the front of connector 250, and may be inserted into an appropriate female receptacle, and the coupling nut sleeve 284 tightened or torqued to thread the connector 250 onto a female connector. At the engagement of the pin cavities 292 and pin slots 280, a radially-extending interface 310 is formed with the longitudinally extending shear pins 282 spanning the radial interfaces 310, at various positions around connector 250. To tighten connector 250, a wrench or other tool is engaged with the nut surfaces 286 of sleeve 284 and a torque force is applied, as illustrated by arrows 312 in FIG. 10A. The torque force is then delivered to portion 264 that is coupled to sleeve 284 through pins 282. In that way, the male connector 250 is tightened onto female connector 12 with the threads 276 of portion 264 engaging threads of connector 12. The coupling nut sleeve might be dimensioned appropriately to resemble the dimensions of a typical male SMA connector, for example.

A suitable torque force may be applied to tighten the male 250 and female 12 connectors together. However, if the torque force exceeds some value or range, a shear occurs. If a torque force, for example, exceeding 8 inch pounds or greater is applied and the connector 250 is completely seated and tight so the connector 250 will not turn further, the force is translated to interface 310. This creates a shear force on the shear pins 282. Depending upon the dimensions of the shear pins 282, as well as the material of the shear pins, an appropriate shear force to cause shearing may be selected. If the rotational torque 312 exceeds the noted shear force associated with the pins 282, those pins will shear into separate sections, as illustrated in FIG. 10B. Such a shearing action and break, as illustrated, then mechanically decouples the coupling nut sleeve 284 from the coupling nut portion 264. Whereas normally, those two elements are rotationally coupled together for rotating the threads 276 onto a female connector, once they are decoupled, the coupling nut sleeve 284 will spin freely with respect to the coupling nut portion 264 and cable 254. Therefore, additional torque motion or torque force as applied in the direction of arrow 312 will no longer be translated to the threaded section 272 of coupling nut portion 264, and the male connector 250 will not be tightened any further onto female connector 12. Instead, the coupling nut sleeve 284 will spin freely. In that way, damage to connector 12 from over-torquing is prevented.

As noted, tightening and creating a torque force for example that exceeds 8 inch pounds will break or shear the shear pin or otherwise cause a shear to occur. The invention is not limited to a specific torque force for causing shear and any suitable value that would prevent damage to equipment and/or a connector might be selected as appropriate. For example, the connector might be configured to have a shear value in the range of 8-15 inch pounds.

In accordance with one aspect of the present invention in the embodiment of FIGS. 8-10B, even if the pins 282 are sheared to decouple the coupling nut sleeve 284 from the rest of the connector, the connector 250 and cable 252 will still stay threaded and attached to female connector 12. If the connection is suitable, the cable 252 and connector 250 may be left in place, such as connected to equipment 14. If it is desirable to remove connector 250, a tool may be used to engage one or more tool slots, or tool cavities 320. The slots/cavities 320 are positioned rearwardly on the coupling nut portion 264, opposite the threaded section 272, and may be engaged to unthread the portion 264 and connector 250 from the corresponding female connector 12. As such, the connector 250 and cable 252 may then be disconnected and removed, as desired.

What is claimed is:

1. A connector comprising:
a female portion including a receptacle;
a male portion, separate from the female portion and including a center conductor, the male portion configured for coupling together with the seperate female portion at a longitudinal interface for forming the connector;
a shear collar formed on at least one of the male portion or female portion and configured for rotatably coupling with the other of the at least one male portion and female portion when the seperate portions are brought together, the shear collar having a first cavity formed therein and extending radially through the collar toward a center of the connector portion;
the other of the at least one of the male portion and female portion including a corresponding second cavity extending radially therein toward a center of the connector portion, the first and second cavities configured for being radially aligned to span across the longitudinal interface when the male and female portions are brought together;
a shear pin configured for engaging both the first and second aligned cavities and spanning radially in the connector and across the interface for joining the male and female portions together as a connector, the shear pin including a shear section aligned to span across the interface and configured for breaking when a sufficient rotational torque force is applied to one of the male portion and the female portion with respect to the other portion.

2. The connector of claim 1 wherein the shear collar is coupled with the female portion and configured for rotating around the male portion when the portions are brought together.

3. The connector of claim 1 wherein the joined male and female portions forming the connector are configured for being separated when the shear pin is broken.

4. The connector of claim 3 wherein at least one of the male and female portions includes a flattened section formed thereon, the flattened section configured for rotating the at least one male and female portion when the portions are separated when the shear pin is broken.

5. The connector of claim 1 wherein the shear pin is one of threaded or press fit into engagement with one or more cavities to secure the shear pin and join the male and female portions to form the connector.

6. The connector of claim 1 wherein the male and female portions are configured and dimensioned to form an SMA connector.

7. The connector of claim 1 wherein the sufficient torque force exceeds 8 inch pounds.

8. The connector of claim 1 wherein the connector is configured for use with another connector of a specific connector standard, the male portion including a nut section for rotating and securing the connector to a female connector of the specific connector standard, the nut section having a dimension different from a nut associated with the specific connector standard to deter further rotation of the male portion once it is attached to the female connector.

9. A connector comprising:
a coupling nut portion having a nut section and a collar;
a lock nut portion having a threaded section and a collar, the threaded section configured for being threaded with another connector, the coupling nut portion and lock nut portion configured for rotatably coupling together at a radial interface at the collars to form the connector;
each of the coupling nut portion and lock nut portions having at least one cavity extending axially through the respective collar of the portion, the cavities configured for being axially aligned when the coupling nut portion and lock nut portion are rotatably coupled together;
a shear pin configured for engaging both the aligned cavities and spanning across the radial interface for joining the coupling nut portion and lock nut portion together as a connector, the shear pin including a shear section aligned to span across the radial interface at the collars and configured for breaking when a sufficient rotational torque force is applied between the coupling nut portion and lock nut portion.

10. The connector of claim 9 wherein the coupling nut portion and lock nut portion have a plurality of cavities extending axially therein.

11. The connector of claim 9 wherein the nut section is configured for being engaged to rotate the connector and tighten the threaded section of the connector.

12. The connector of claim 9 wherein the joined coupling nut portion and lock nut portion forming the connector are configured for being separated when the shear pin is broken.

13. The connector of claim 9 wherein the shear pin is one of threaded or press fit into engagement with one or more of the cavities to secure the shear pin and join the coupling nut portion and lock nut portion to form the connector.

14. The connector of claim 9 wherein the lock nut portion threaded section is configured and dimensioned to form an SMA connector.

15. The connector of claim 9 wherein the sufficient torque force exceeds 8 inch pounds.

16. The connector of claim 9 further comprising a cable portion configured for being fixed to the end of a cable, the coupling nut portion configured for rotatably engaging the cable portion to rotate with respect to a cable.

17. A connector comprising:
a coupling nut portion having a threaded section and a collar, the collar including at least one slot extending axially through the collar;
a coupling nut sleeve including at least one cavity extending axially through the sleeve, the coupling nut portion and coupling nut sleeve configured for rotatably coupling together at a radial interface to form the connector;
the axial cavity and axial slot configured for being axially aligned when the coupling nut portion and coupling nut sleeve are rotatably coupled together;
a shear pin configured for engaging both the aligned cavity and slot and spanning across the radial interface for joining the coupling nut portion and coupling nut sleeve together as a connector, the shear pin spanning the interface and configured for breaking when a sufficient rotational torque force is applied between the coupling nut portion and coupling nut sleeve.

18. The connector of claim 17 further comprising a lock nut, the lock nut configured for engaging the coupling nut portion and securing the coupling nut sleeve with the coupling nut portion when they are coupled together.

19. The connector of claim 18 wherein the coupling nut portion includes external threads, the lock nut being threaded thereon for securing the coupling nut sleeve with the coupling nut portion.

20. The connector of claim 17 wherein the coupling nut portion has a plurality of slots and the coupling nut sleeve has a plurality of cavities, a plurality of shear pins configured for engaging aligned slots and cavities.

21. The connector of claim 17 wherein the coupling nut sleeve is configured for being engaged to rotate the connector and tighten the threaded section of the connector.

22. The connector of claim 17 wherein the coupling nut portion threaded section is configured and dimensioned to form an SMA connector.

23. The connector of claim 17 wherein the sufficient torque force exceeds 8 inch pounds.

24. The connector of claim 17 further comprising a cable portion configured for being fixed to the end of a cable, the coupling nut portion configured for rotatably engaging the cable portion to rotate with respect to a cable.

* * * * *